(12) United States Patent
Morita

(10) Patent No.: US 10,316,148 B2
(45) Date of Patent: Jun. 11, 2019

(54) ORGANOPOLYSILOXANE, PRODUCTION METHOD THEREOF, AND CURABLE SILICONE COMPOSITION

(71) Applicant: Dow Corning Toray Co., Ltd., Tokyo (JP)

(72) Inventor: Yoshitsugu Morita, Chiba (JP)

(73) Assignee: Dow Toray Co., Ltd., Tokyo (JP)

( * ) Notice: Subject to any disclaimer, the term of this patent is extended or adjusted under 35 U.S.C. 154(b) by 0 days.

(21) Appl. No.: 15/559,419

(22) PCT Filed: Mar. 11, 2016

(86) PCT No.: PCT/JP2016/001405
§ 371 (c)(1),
(2) Date: Sep. 18, 2017

(87) PCT Pub. No.: WO2016/152073
PCT Pub. Date: Sep. 29, 2016

(65) Prior Publication Data
US 2018/0079866 A1 Mar. 22, 2018

(30) Foreign Application Priority Data

Mar. 20, 2015 (JP) ................. 2015-057016

(51) Int. Cl.
| | | |
|---|---|---|
| C08G 77/20 | (2006.01) |
| C08G 77/50 | (2006.01) |
| C08G 77/52 | (2006.01) |
| C08G 77/12 | (2006.01) |
| C08L 83/06 | (2006.01) |

(52) U.S. Cl.
CPC ............. *C08G 77/20* (2013.01); *C08G 77/12* (2013.01); *C08G 77/50* (2013.01); *C08G 77/52* (2013.01); *C08L 83/06* (2013.01)

(58) Field of Classification Search
None
See application file for complete search history.

(56) References Cited

U.S. PATENT DOCUMENTS

| 5,247,046 | A * | 9/1993 | Takago | C08L 83/14 |
| | | | | 528/15 |
| 8,164,202 | B2 * | 4/2012 | Kashiwagi | H01L 24/48 |
| | | | | 257/100 |
| 8,847,414 | B2 * | 9/2014 | Cha | C08L 83/04 |
| | | | | 257/788 |
| 8,916,645 | B2 * | 12/2014 | Hu | C08G 77/04 |
| | | | | 524/588 |
| 8,952,108 | B2 * | 2/2015 | Inoki | C08G 77/045 |
| | | | | 525/478 |
| 8,987,358 | B2 * | 3/2015 | Kawabata | C07F 7/21 |
| | | | | 524/101 |
| 9,115,243 | B2 * | 8/2015 | Kawabata | C09D 183/04 |
| 2003/0171476 | A1 | 9/2003 | Li et al. | |
| 2003/0171486 | A1 | 9/2003 | Li et al. | |
| 2006/0057297 | A1 * | 3/2006 | Chevalier | C08G 77/20 |
| | | | | 427/387 |
| 2006/0073347 | A1 | 4/2006 | Morita et al. | |
| 2007/0129508 | A1 | 6/2007 | Kashiwagi | |
| 2007/0197742 | A1 * | 8/2007 | Yamakawa | C08L 83/04 |
| | | | | 525/478 |
| 2008/0090986 | A1 * | 4/2008 | Khanarian | C08G 77/52 |
| | | | | 528/15 |
| 2008/0213492 | A1 * | 9/2008 | Morita | C09D 179/04 |
| | | | | 427/387 |
| 2008/0318067 | A1 * | 12/2008 | Itoh | C08J 5/18 |
| | | | | 428/447 |
| 2009/0118440 | A1 | 5/2009 | Nakanishi et al. | |
| 2009/0246499 | A1 * | 10/2009 | Katsoulis | C09D 183/04 |
| | | | | 428/220 |
| 2009/0259002 | A1 | 10/2009 | Kashiwagi | |
| 2011/0092647 | A1 | 4/2011 | Morita et al. | |
| 2012/0172544 | A1 | 7/2012 | Liang et al. | |
| 2012/0270998 | A1 * | 10/2012 | Koh | C08G 77/20 |
| | | | | 524/588 |

(Continued)

FOREIGN PATENT DOCUMENTS

| JP | 2004143361 A | 5/2004 |
| JP | 2005519171 A | 6/2005 |
| JP | 2005529986 A | 10/2005 |
| JP | 20078996 A | 1/2007 |
| JP | 2007182549 A | 7/2007 |
| JP | 2009242627 A | 10/2009 |
| JP | 2009275214 A | 11/2009 |
| JP | 2012140617 A | 7/2012 |
| WO | WO2015194159 A1 | 12/2015 |

OTHER PUBLICATIONS

PCT/JP2016/001405 International Search Report dated Jun. 7, 2016, 3 pages.
English language abstract and machine translation for WO2015194159 (A1) extracted from http://worldwide.espacenet.com database on Sep. 14, 2017, 21 pages.

*Primary Examiner* — Robert S Loewe
(74) *Attorney, Agent, or Firm* — Warner Norcross & Judd LLP

(57) ABSTRACT

An organopolysiloxane represented by the following average unit formula: $(R^1SiO_{3/2})_a(XR^2{}_2SiO_{1/2})_b(O_{1/2}SiR^2{}_2-Y-R^2{}_2SiO_{1/2})_c$ is provided. $R^1$ and $R^2$ each individually represent a $C_1$-$C_{20}$ alkyl group, $C_6$-$C_{20}$ aryl group, or $C_7$-$C_{20}$ aralkyl group. X represents a $C_2$-$C_{12}$ alkenyl group or a siloxane residue and Y represents a siloxane linking group. Alternatively X represents a $C_2$-$C_{12}$ alkenyl group or a silphenylene residue and Y represents a silphenylene linking group. Subscript "a" is a number in a range of 0.65 to 0.90, "b" is a number in a range of 0.10 to 0.35, "c" is a number in a range of 0 to 0.10, and "a"+"b"+"c"=1.00. The organopolysiloxane has a siloxane residue or silphenylene residue having a silicon atom-bonded hydrogen atom in an organopolysiloxane resin block. The organopolysiloxane generally exhibits high refractive index and high transparency as well as excellent handleability.

20 Claims, No Drawings

(56) References Cited

U.S. PATENT DOCUMENTS

| | | |
|---|---|---|
| 2014/0231861 A1 | 8/2014 | Yang et al. |
| 2014/0231862 A1 | 8/2014 | Yang et al. |
| 2015/0141608 A1* | 5/2015 | Ko .................... H01L 33/56 |
| | | 528/32 |
| 2015/0263249 A1* | 9/2015 | Yoo ................... H01L 33/56 |
| | | 252/586 |

* cited by examiner

ORGANOPOLYSILOXANE, PRODUCTION METHOD THEREOF, AND CURABLE SILICONE COMPOSITION

CROSS-REFERENCE TO RELATED APPLICATIONS

This application is the National Stage of International Application No. PCT/JP2016/001405 filed on 11 Mar. 2016, which claims priority to and all advantages of JP Patent Application No. 2015-057016 filed on 20 Mar. 2015, the content of which is hereby incorporated by reference.

TECHNICAL FIELD

The present invention relates to a novel organopolysiloxane having a siloxane residue or silphenylene residue having a silicon atom-bonded hydrogen atom in an organopolysiloxane resin block, production method thereof, and a curable silicone composition containing the organopolysiloxane.

BACKGROUND ART

Curable silicone compositions that are cured by hydrosilylation reaction to form cured products having a high refractive index and high light transmittance have been used as protective agents, coating agents, or sealing agents for semiconductor elements in optical semiconductor devices such as photocouplers, light emitting diodes (LEDs), solid-state image sensing devices, or the like. As such a curable silicone composition, a curable silicone composition comprising: a straight-chain organopolysiloxane having, in a molecule, at least two alkenyl groups and at least one aryl group; a branched-chain organopolysiloxane having, in a molecule, at least one alkenyl group and at least one aryl group, and having siloxane units represented by general formula: $RSiO_{3/2}$ (in the formula, R is a substituted or unsubstituted monovalent hydrocarbon group); an organopolysiloxane having, in a molecule, at least two silicon atom-bonded hydrogen atoms; and a hydrosilylation catalyst has been known (see Patent Document 1).

As organopolysiloxanes having a silicon atom-bonded hydrogen atom, straight-chain, branched-chain, or resin-like organopolysiloxanes have been used; however, to enhance mechanical characteristics or the like of the resulting cured product obtained by curing a curable silicone composition, Patent Documents 2 and 3 propose use of an organopolysiloxane that is composed of an organopolysiloxane resin block and a diorganopolysiloxane block, and that has a resin structure having a silicon atom-bonded hydrogen atom.

Patent Documents 2 and 3 describe production of an organopolysiloxane by subjecting an organotrichlorosilane, a diorganopolysiloxane in which silicon atoms at both molecular terminals are capped with halogen atoms, chlorosilane having a silicon atom-bonded hydrogen atom, and chlorosilane having an alkenyl group to a co-hydrolytic condensation reaction. However, such methods cannot prepare an organopolysiloxane having a siloxane residue or silphenylene residue having a silicon atom-bonded hydrogen atom in an organopolysiloxane resin block.

Meanwhile, Patent Document 4 describes a branched-chain organopolysiloxane having a siloxane residue having a silicon atom-bonded hydrogen atom as the organopolysiloxane of Formula 16. However, in Patent Document 4, an organopolysiloxane having a siloxane residue or silphenylene residue having a silicon atom-bonded hydrogen atom in an organopolysiloxane resin block is not suggested.

Furthermore, Patent Document 5 describes preparation of a solvent-soluble organopolysiloxane by subjecting an organopolysiloxane resin having an alkenyl group and a diorganopolysiloxane having silicon atom-bonded hydrogen atoms at both molecular terminals to a hydrosilylation reaction at an amount such that the amount of the silicon atom-bonded hydrogen atoms in the diorganopolysiloxane is less than 1 mol per 1 mol of alkenyl groups in the organopolysiloxane resin. However, in Patent Document 5, an organopolysiloxane having a siloxane residue or silphenylene residue having a silicon atom-bonded hydrogen atom in an organopolysiloxane resin block is not suggested.

CITATION LIST

Patent Literature

Patent Document 1: Japanese Unexamined Patent Application Publication No. 2004-143361A
Patent Document 2: Japanese Unexamined Patent Application Publication No. 2007-182549A
Patent Document 3: Japanese Unexamined Patent Application Publication No. 2009-275214A
Patent Document 4: Japanese Unexamined Patent Application Publication No. 2012-140617A
Patent Document 5: Japanese Unexamined Patent Application Publication No. 2009-242627A

SUMMARY OF INVENTION

Technical Problem

An object of the present invention is to provide an organopolysiloxane having a siloxane residue or silphenylene residue having a silicon atom-bonded hydrogen atom in an organopolysiloxane resin block, and exhibiting high refractive index and high transparency as well as good handleability, and a production method thereof. Furthermore, another object of the present invention is to provide a curable silicone composition that forms a flexible cured product.

Solution to Problem

The organopolysiloxane of the present invention is represented by the following average unit formula:

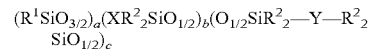

In the formula,
$R^1$ and $R^2$ each independently represent an alkyl group having from 1 to 12 carbons, aryl group having from 6 to 20 carbons, or aralkyl group having from 7 to 20 carbons; X represents an alkenyl group having from 2 to 12 carbons or a siloxane residue represented by the following general formula (1):

(in the formula, $R^3$ each independently represent an alkyl group having from 1 to 12 carbons, aryl group having from 6 to 20 carbons, or aralkyl group having from 7 to 20 carbons, $R^4$ represents an alkylene group having from 2 to 12 carbons, and "n" is a number in a range of 0 to 5),
and
Y represents a siloxane linking group represented by the following general formula (2):

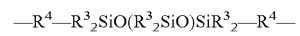

(in the formula, $R^3$, $R^4$, and "n" are synonymous with those described above);
or
X represents an alkenyl group having from 2 to 12 carbons or a silphenylene residue represented by the following general formula (3):

$$HR^3{}_2Si—C_6H_4—SiR^3{}_2—R^4—$$

(in the formula, $R^3$ and $R^4$ are synonymous with those described above);
and
Y represents a silphenylene linking group represented by the following general formula (4):

$$—R^4—R^3{}_2Si—C_6H_4—SiR^3{}_2—R^4—$$

(in the formula, $R^3$ and $R^4$ are synonymous with those described above);
and
"a" is a number in a range of 0.65 to 0.90, "b" is a number in a range of 0.10 to 0.35,
"c" is a number in a range of 0 to 0.10, and "a"+"b"+"c"=1.00.

Furthermore, the production method of the present invention comprising
subjecting (A) an organopolysiloxane resin represented by the following average unit formula:

$$(R^1SiO_{3/2})_d(R^5R^2{}_2SiO_{1/2})_e$$

(in the formula, $R^1$ and $R^2$ each independently represent an alkyl group having from 1 to 12 carbons, aryl group having from 6 to 20 carbons, or aralkyl group having from 7 to 20 carbons; $R^5$ represents an alkenyl group having from 2 to 12 carbons; "d" is a number in a range of 0.65 to 0.90, "e" is a number in a range of 0.10 to 0.35, and "d"+"e"=1.00); and
(B) (B1) a diorganosiloxane represented by the following general formula:

$$HR^3{}_2SiO(R^3{}_2SiO)_nSiR^3{}_2H$$

(in the formula, $R^3$ each independently represent an alkyl group having from 1 to 12 carbons, aryl group having from 6 to 20 carbons, or aralkyl group having from 7 to 20 carbons, and "n" is a number in a range of 0 to 5),
or (B2) a disilylbenzene represented by the following general formula:

$$HR^3{}_2Si—C_6H_4—SiR^3{}_2H$$

(in the formula, $R^3$ is synonymous with those described above);
to a hydrosilylation reaction at an amount so that an amount of silicon atom-bonded hydrogen atoms in component (B) exceeds 1 mol per 1 mol of alkenyl groups in component (A).

Furthermore, the curable silicone composition of the present invention is curable by a hydrosilylation reaction and contains the organopolysiloxane described above.

Effect of Invention

The organopolysiloxane of the present invention is a novel compound having a siloxane residue or silphenylene residue having a silicon atom-bonded hydrogen atom in an organopolysiloxane resin block, and exhibiting high refractive index and high transparency as well as excellent handleability. Furthermore, the production method of the present invention can efficiently produce such a novel organopolysiloxane. Furthermore, the curable silicone composition of the present invention can form a cured product that is flexible.

DETAILED DESCRIPTION OF THE INVENTION

First, the organopolysiloxane of the present invention will be described in detail.
The organopolysiloxane of the present invention is represented by the following average unit formula:

$$(R^1SiO_{3/2})_a(XR^2{}_2SiO_{1/2})_b(O_{1/2}SiR^2{}_2—Y—R^2{}_2SiO_{1/2})_c$$

In the average unit formula above, $R^1$ and $R^2$ each independently represent an alkyl group having from 1 to 12 carbons, aryl group having from 6 to 20 carbons, or aralkyl group having from 7 to 20 carbons. Specific examples include alkyl groups such as a methyl group, ethyl group, propyl group, isopropyl group, butyl group, isobutyl group, tert-butyl group, pentyl group, neopentyl group, hexyl group, cyclohexyl group, octyl group, nonyl group, and decyl group; aryl groups such as a phenyl group, tolyl group, xylyl group, and naphthyl group; and aralkyl groups such as a benzyl group, phenethyl group, and phenylpropyl group. Note that, due to capability of making refractive index of the organopolysiloxane higher, at least 10 mol % of $R^1$ are aryl groups having from 6 to 20 carbons, and preferably phenyl groups.

In the average unit formula above,
X represents an alkenyl group having from 2 to 12 carbons or a siloxane residue represented by the following general formula (1):

$$HR^3{}_2SiO(R^3{}_2SiO)_nSiR^3{}_2—R^4—$$

and
Y represents a siloxane linking group represented by the following general formula (2):

$$—R^4—R^3{}_2SiO(R^3{}_2SiO)_nSiR^3{}_2—R^4—;$$

or
X represents an alkenyl group having from 2 to 12 carbons or a silphenylene residue represented by the following general formula (3):

$$HR^3{}_2Si—C_6H_4—SiR^3{}_2—R^4—$$

and
Y represents a silphenylene linking group represented by the following general formula (4):

$$—R^4—R^3{}_2Si—C_6H_4—SiR^3{}_2—R^4—$$

In the average unit formula above, examples of the alkenyl group for X include a vinyl group, allyl group, isopropenyl group, butenyl group, pentenyl group, hexenyl group, cyclohexenyl group, and octenyl group. Of these, a vinyl group is preferable.

In the general formula (1) above, $R^3$ each independently represent an alkyl group having from 1 to 12 carbons, aryl group having from 6 to 20 carbons, or aralkyl group having from 7 to 20 carbons, and examples include the same groups exemplified for $R^2$ described above.

In the general formula (1) above, $R^4$ is an alkylene group having from 2 to 12 carbons. Specific examples include an ethylene group, propylene group, isopropylene group, butylene group, pentylene group, hexylene group, cyclohexylene group, and octylene group. Of these, an ethylene group is preferable.

In the general formula (1) above, "n" is a number in a range of 0 to 5, preferably a number in a range of 0 to 4 or a number in a range of 0 to 3. This is because, when "n" is a number within the range described above, transparency of the organopolysiloxane resin can be enhanced without lowering the refractive index thereof.

Examples of the siloxane residue represented by the general formula (1) above include the following groups. Note that, in the formula, "n" is an integer in a range of 0 to 5.

$H(CH_3)_2SiO[(CH_3)_2SiO]_nSi(CH_3)_2—C_2H_4—$

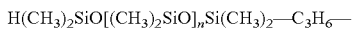
$H(CH_3)_2SiO[(CH_3)_2SiO]_nSi(CH_3)_2—C_3H_6—$

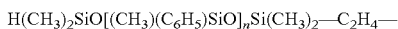
$H(CH_3)_2SiO[(CH_3)(C_6H_5)SiO]_nSi(CH_3)_2—C_2H_4—$

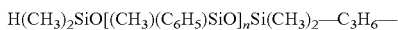
$H(CH_3)_2SiO[(CH_3)(C_6H_5)SiO]_nSi(CH_3)_2—C_3H_6—$

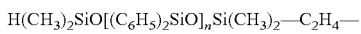
$H(CH_3)_2SiO[(C_6H_5)_2SiO]_nSi(CH_3)_2—C_2H_4—$

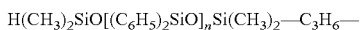
$H(CH_3)_2SiO[(C_6H_5)_2SiO]_nSi(CH_3)_2—C_3H_6—$

In the general formula (2) above, $R^3$, $R^4$, and "n" are synonymous with those described above. Examples of the siloxane linking group represented by the general formula (2) above include the following groups. Note that, in the formula, "n" is an integer in a range of 0 to 5.

$—C_2H_4—(CH_3)_2SiO[(CH_3)_2SiO]_nSi(CH_3)_2—C_2H_4—$

$—C_3H_6—(CH_3)_2SiO[(CH_3)_2SiO]_nSi(CH_3)_2—C_3H_6—$

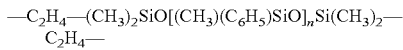
$—C_2H_4—(CH_3)_2SiO[(CH_3)(C_6H_5)SiO]_nSi(CH_3)_2—C_2H_4—$

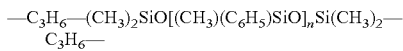
$—C_3H_6—(CH_3)_2SiO[(CH_3)(C_6H_5)SiO]_nSi(CH_3)_2—C_3H_6—$

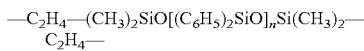
$—C_2H_4—(CH_3)_2SiO[(C_6H_5)_2SiO]_nSi(CH_3)_2—C_2H_4—$

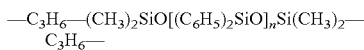
$—C_3H_6—(CH_3)_2SiO[(C_6H_5)_2SiO]_nSi(CH_3)_2—C_3H_6—$

In the general formula (3) above, $R^3$ and $R^4$ are synonymous with those described above. Examples of the silphenylene residue represented by the general formula (3) above include the following groups.

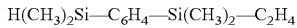
$H(CH_3)_2Si—C_6H_4—Si(CH_3)_2—C_2H_4$

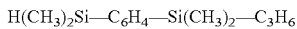
$H(CH_3)_2Si—C_6H_4—Si(CH_3)_2—C_3H_6$

In the general formula (4) above, $R^3$ and $R^4$ are synonymous with those described above. Examples of the silphenylene linking group represented by the general formula (4) above include the following groups.

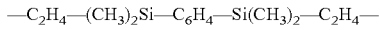
$—C_2H_4—(CH_3)_2Si—C_6H_4—Si(CH_3)_2—C_2H_4—$

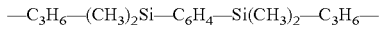
$—C_3H_6—(CH_3)_2Si—C_6H_4—Si(CH_3)_2—C_3H_6—$

Furthermore, in the average unit formula above, "a" is a number in a range of 0.65 to 0.90, "b" is a number in a range of 0.10 to 0.35, "c" is a number in a range of 0 to 0.10, and "a"+"b"+"c"=1.00, and preferably "a" is a number in a range of 0.70 to 0.85, "b" is a number in a range of 0.15 to 0.30, "c" is a number in a range of 0 to 0.07, and "a"+"b"+"c"=1.00. This is because, when "a" is equal to or greater than the lower limit of the range described above, the molecular weight of the organopolysiloxane can be increased high, and a cured product having excellent mechanical strength can be formed when the organopolysiloxane is added to a curable silicone composition. On the other hand, when "a" is equal to or less than the upper limit of the range described above, a large amount of siloxane residue or silphenylene residue having a silicon atom-bonded hydrogen atom can be introduced, and, when the organopolysiloxane is added to a curable silicone composition, the reactivity thereof can be enhanced. Furthermore, this is because, when "b" is equal to or greater than the lower limit of the range described above, the molecular weight of the organopolysiloxane can be lowered, and the handling workability thereof can be enhanced. On the other hand, when "b" is equal to or less than the upper limit of the range described above, a cured product having excellent mechanical strength can be formed when the organopolysiloxane is added to a curable silicone composition. Furthermore, when "c" is within the range described above, when the organopolysiloxane is added to a curable silicone composition, the reactivity and handling workability thereof are enhanced.

Furthermore, although the refractive index (25° C.) of the organopolysiloxane for visible light (589 nm) is not limited, the refractive index is preferably 1.50 or higher. This is because the organopolysiloxane can be advantageously used in optical materials having a high refractive index.

Next, the method of producing the organopolysiloxane of the present invention will be described in detail.

Component (A) is an organopolysiloxane resin represented by the following average unit formula:

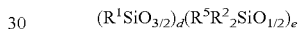
$(R^1SiO_{3/2})_d(R^5R^2_2SiO_{1/2})_e$

In the formula, $R^1$ and $R^2$ each independently represent an alkyl group having from 1 to 12 carbons, aryl group having from 6 to 20 carbons, or aralkyl group having from 7 to 20 carbons. Specifically, alkyl groups, aryl groups, and aralkyl groups that are similar to those described above are exemplified. Note that, due to capability of making refractive index of the resulting organopolysiloxane higher, at least 10 mol % of $R^1$ are aryl groups having from 6 to 20 carbons, and preferably phenyl groups.

In the formula, $R^5$ is an alkenyl group having from 2 to 12 carbons. Specific examples include a vinyl group, allyl group, isopropenyl group, butenyl group, pentenyl group, hexenyl group, cyclohexenyl group, and octenyl group. Of these, a vinyl group is preferable.

In the formula, "d" is a number in a range of 0.65 to 0.90, "e" is a number in a range of 0.10 to 0.35, and "d"+"e"=1.00, and preferably "d" is a number in a range of 0.70 to 0.85, "e" is a number in a range of 0.15 to 0.30, and "d"+"e"=1.00. This is because, when "d" is equal to or greater than the lower limit of the range described above, i.e. "e" is equal to or less than the upper limit of the range described above, the molecular weight of the resulting organopolysiloxane can be increased high. On the other hand, when "d" is equal to or less than the upper limit of the range described above, i.e. "e" is equal to or greater than the lower limit of the range described above, the reactivity to component (B) will be excellent.

The natures of component (A) at 25° C. are not limited, and for example, component (A) is solid or liquid having a viscosity of 10 mPa·s or higher, at 25° C.

Component (B) is a raw material for linking the organopolysiloxane resin of component (A) described above, and is (B1) a diorganosiloxane represented by the following general formula:

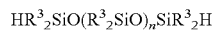
$HR^3_2SiO(R^3_2SiO)_nSiR^3_2H$ or (B2) a disilylbenzene represented by the following general formula:

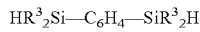

For component (B1), in the formula, $R^2$ and $R^3$ each independently represent an alkyl group having from 1 to 12 carbons, aryl group having from 6 to 20 carbons, or aralkyl group having from 7 to 20 carbons, and examples thereof are the same as the groups described above.

Furthermore, for component (B1), in the formula, "n" is a number in a range of 0 to 5, and preferably a number in a range of 0 to 4 or a number in a range of 0 to 3. This is because, when "n" is a number within the range described above, transparency of the resulting organopolysiloxane can be enhanced without lowering the refractive index thereof. Note that, for component (B), when all of $R^2$ and $R^3$ in the formula are alkyl groups having from 1 to 12 carbons, "n" is preferably 0.

Examples of such component (B1) include the following diorganosiloxanes.

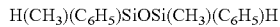

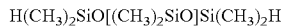

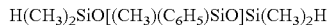

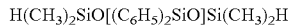

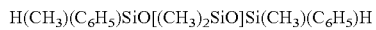

For component (B2), in the formula, $R^3$ each independently represent an alkyl group having from 1 to 12 carbons, aryl group having from 6 to 20 carbons, or aralkyl group having from 7 to 20 carbons, and examples thereof are the same as the groups described above.

Examples of such component (B2) include the following disilylbenzenes.

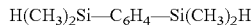

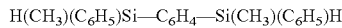

In the production method of the present invention, the added amount of the component (B) is an amount so that the amount of silicon atom-bonded hydrogen atoms in component (B) exceeds 1 mol, and preferably 1.5 mol or greater or 1.8 mol or greater, per 1 mol of alkenyl groups in component (A). This is because, when the added amount of component (B) is equal to or greater than the lower limit of the range described above, introduction of the siloxane residue or silphenylene residue having a silicon atom-bonded hydrogen atom is facilitated.

The hydrosilylation catalyst for accelerating the reaction described above is not limited, and examples include platinum-based catalysts, rhodium-based catalysts, and palladium-based catalysts. In particular, platinum-based catalysts are preferable due to capability of significantly accelerating the hydrosilylation reaction. Examples of the platinum-based catalyst include a platinum fine powder, chloroplatinic acid, an alcohol solution of chloroplatinic acid, a platinum-alkenylsiloxane complex, a platinum-olefin complex, and a platinum-carbonyl complex, and a platinum-alkenylsiloxane complex is particularly preferred. Examples of the alkenylsiloxane include 1,3-divinyl-1,1,3,3-tetramethyldisiloxane, 1,3,5,7-tetramethyl-1,3,5,7-tetravinylcyclotetrasiloxane, alkenylsiloxanes having part of the methyl groups of these alkenylsiloxane substituted by a group such as an ethyl group or phenyl group, and alkenylsiloxanes having vinyl groups of these alkenylsiloxane substituted by a group such as an allyl group or hexenyl group.

The added amount of the hydrosilylation catalyst in the preparation method described above is not limited, and for example, the added amount is preferably an amount at which, in terms of mass, the content of catalyst metals is in a range of 0.01 to 1,000 ppm, and particularly preferably in a range of 0.1 to 500 ppm, relative to the total amount of components (A) and (B). This is because, when the added amount of the hydrosilylation catalyst is equal to or greater than the lower limit of the range described above, the hydrosilylation reaction can be sufficiently accelerated. On the other hand, when the added amount of the hydrosilylation catalyst is equal to or less than the upper limit of the range described above, troubles such as coloration of the resulting organopolysiloxane are less likely to occur.

The reaction conditions in the preparation method described above are not limited, and the reaction can be accelerated by heating. Furthermore, when a solvent such as an aromatic solvent, such as toluene or xylene, or an aliphatic solvent, such as heptane or hexane, is used in this reaction system, the reaction temperature is preferably the reflux temperature of the solvent, and when no organic solvents are used, the reaction temperature is preferably 200° C. or lower. Note that, in this reaction, by using an organic solvent, dewatering of the reaction system can be performed utilizing an azeotrope with water or the like while the viscosity of the reaction system is lowered.

The organopolysiloxane obtained as described above has organopolysiloxane resin blocks linked by siloxy groups or silphenylene groups, and the organopolysiloxane is soluble in solvents such as aromatic solvents, such as toluene and xylene, and aliphatic solvents, such as heptane and hexane. The natures thereof at 25° C. are not particularly limited, and examples thereof include liquid, viscous liquid, and solid.

Since the organopolysiloxane of the present invention contains silicon atom-bonded hydrogen atom in a molecule, by blending this organopolysiloxane to a hydrosilylation curable silicone composition, or by forming a hydrosilylation curable silicone composition by blending this organopolysiloxane, an organopolysiloxane having an alkenyl group, and a hydrosilylation catalyst, a cured product having a suitable elastic modulus can be formed after being cured.

An example of such a curable silicone composition is a hydrosilylation curable silicone composition comprising:

(I) an organopolysiloxane having at least two alkenyl groups in a molecule;

(II) the organopolysiloxane of the present invention, in an amount that an amount of silicon atom-bonded hydrogen atoms in this component is from 0.1 to 10 mol per 1 mol of alkenyl groups in component (I); and (III) a hydrosilylation catalyst, in an amount that accelerates curing of the present composition.

Component (I) is an organopolysiloxane having at least two alkenyl groups in a molecule. Examples of the alkenyl groups of the component (I) include alkenyl groups having from 2 to 12 carbons such as vinyl groups, allyl groups, butenyl groups, pentenyl groups, hexenyl groups, heptenyl groups, octenyl groups, nonenyl groups, decenyl groups, undecenyl groups, and dodecenyl groups. Of these, vinyl groups are preferred. Examples of the group bonded to a silicon atom, except alkenyl group, of component (I) include alkyl groups having from 1 to 12 carbons, such as a methyl group, ethyl group, propyl group, isopropyl group, butyl group, isobutyl group, tert-butyl group, pentyl group, neopentyl group, hexyl group, cyclohexyl group, heptyl group, octyl group, nonyl group, decyl group, undecyl group, and dodecyl group; aryl groups having from 6 to 20 carbons, such as a phenyl group, tolyl group, xylyl group, and naphthyl group; aralkyl groups having from 7 to 20 carbons, such as a benzyl group, phenethyl group, and phenylpropyl group; and groups in which a part or all of hydrogen atoms in these groups are substituted with halogen atoms, such as fluorine atoms, chlorine atoms, and bromine atoms. Note that the silicon atom in component (I) may have a little amount of hydroxy group and/or alkoxy group such as a methoxy group and ethoxy group in a range that does not impair the object of the present invention.

The molecular structure of component (I) is not limited, and examples thereof include straight-chain, partially-branched straight chain, branched-chain, cyclic, and three-dimensional network structures. Component (I) may be a single organopolysiloxane having such a molecular structure or a mixture of two or more types of organopolysiloxanes having these molecular structures.

The organopolysiloxane of component (II) is as described above. The content of component (II) is an amount so that the amount of silicon atom-bonded hydrogen atom in component (II) is from 0.1 to 10 mol, and preferably from 0.5 to 5 mol, per 1 mol of alkenyl groups in component (I). This is because, when the content of component (II) is equal to or less than the upper limit of the range described above, lowering of mechanical characteristics of the resulting cured product can be suppressed. On the other hand, when the content is equal to or greater than the lower limit of the range described above, the resulting composition sufficiently cures.

Component (III) is a hydrosilylation catalyst for accelerating a hydrosilylation reaction of the present composition. Such a hydrosilylation catalyst of component (III) is not limited, and examples include platinum-based catalysts, rhodium-based catalysts, and palladium-based catalysts. In particular, platinum-based catalysts are preferable due to capability of significantly accelerating the hydrosilylation reaction. Examples of the platinum-based catalyst include similar catalysts described above.

The content of component (III) is an amount that accelerates curing of the present composition, and preferably the content is an amount such that the amount of platinum atoms in component (III), in terms of mass, is in a range of 0.01 to 500 ppm, in a range of 0.01 to 100 ppm, or in a range of 0.1 to 50 ppm, relative to the amount of the present composition. This is because, when the content of component (III) is equal to or greater than the lower limit of the range described above, the resulting composition sufficiently cures. On the other hand, when the content is equal to or less than the upper limit of the range described above, coloration of the resulting cured product is suppressed.

The present composition may contain a reaction inhibitor as an optional component to prolong the usable time at ambient temperature and to enhance storage stability. Examples of such a reaction inhibitor include alkyne alcohols, such as 1-ethynylcyclohexan-1-ol, 2-methyl-3-butyn-2-ol, 3,5-dimethyl-1-hexyn-3-ol, and 2-phenyl-3-butyn-2-ol; enyne compounds, such as 3-methyl-3-penten-1-yne and 3,5-dimethyl-3-hexen-1-yne; methylalkenylsiloxane oligomers, such as 1,3,5,7-tetramethyl-1,3,5,7-tetravinylcyclotetrasiloxane and 1,3,5,7-tetramethyl-1,3,5,7-tetrahexenylcyclotetrasiloxane; alkynoxysilanes, such as dimethyl bis(1,1-dimethyl-2-propyn-oxy)silane and methylvinyl bis(1,1-dimethyl-2-propyn-oxy)silane; and triallylisocyanurate-based compounds.

Furthermore, the present composition may contain an organopolysiloxane having at least two silicon atom-bonded hydrogen atoms in a molecule, other than component (II). The molecular structure of this organopolysiloxane is not limited; however, examples thereof include straight-chain, partially-branched straight chain, branched-chain, cyclic, and three-dimensional network structures. Preferable examples include partially-branched straight chain, branched-chain, and three-dimensional network structures. Examples of the group bonded to a silicon atom, except hydrogen, of this organopolysiloxane include alkyl groups having from 1 to 12 carbons, such as a methyl group, ethyl group, propyl group, isopropyl group, butyl group, isobutyl group, tert-butyl group, pentyl group, neopentyl group, hexyl group, cyclohexyl group, heptyl group, octyl group, nonyl group, decyl group, undecyl group, and dodecyl group; aryl groups having from 6 to 20 carbons, such as a phenyl group, tolyl group, xylyl group, and naphthyl group; aralkyl groups having from 7 to 20 carbons, such as a benzyl group, phenethyl group, and phenylpropyl group; and groups in which a part or all of hydrogen atoms in these groups are substituted with halogen atoms, such as fluorine atoms, chlorine atoms, and bromine atoms. Note that this organopolysiloxane may have a little amount of hydroxy group and/or alkoxy group such as a methoxy group and ethoxy group in a range that does not impair the object of the present invention.

Examples of this organopolysiloxane include one type or two or more types selected from the group consisting of 1,1,3,3-tetramethyldisiloxane, 1,3,5,7-tetramethylcyclotetrasiloxane, tris(dimethylhydrogensiloxy)methylsilane, tris(dimethylhydrogensiloxy)phenylsilane, 1-glycidoxypropyl-1,3,5,7-tetramethylcyclotetrasiloxane, 1,5-diglycidoxypropyl-1,3,5,7-tetramethylcyclotetrasiloxane, 1-glycidoxypropyl-5-trimethoxysilylethyl-1,3,5,7-tetramethylcyclotetrasiloxane, methylhydrogenpolysiloxanes capped at both molecular terminals with trimethylsiloxy groups, copolymers of dimethylsiloxane and methylhydrogensiloxane capped at both molecular terminals with trimethylsiloxy groups, dimethylpolysiloxane capped at both molecular terminals with dimethylhydrogensiloxy groups, copolymers of dimethylsiloxane and methylhydrogensiloxane capped at both molecular terminals with dimethylhydrogensiloxy groups, copolymers of methylhydrogensiloxane and diphenylsiloxane capped at both molecular terminals with trimethylsiloxy groups, copolymers of methylhydrogensiloxane, diphenylsiloxane, and dimethylsiloxane capped at both molecular terminals with trimethylsiloxy groups, copolymers composed of $(CH_3)_2HSiO_{1/2}$ units and $SiO_{4/2}$ units, copolymers composed of $(CH_3)_2HSiO_{1/2}$ units and $SiO_{4/2}$ units and $(C_6H_5)SiO_{3/2}$ units, and the like.

Furthermore, the present composition may also contain an adhesion promoter to further enhance adhesion to a substrate with which the composition makes contact during curing. This adhesion promoter is preferably an organosilicon compound having at least one silicon atom-bonded alkoxy group in a molecule. Examples of the alkoxy group include a methoxy group, ethoxy group, propoxy group, butoxy group, methoxyethoxy group, and the like. In particular, a methoxy group and ethoxy group are preferable. Examples of the groups bonded to the silicon atom, except alkoxy groups, of this organosilicon compound include halogen-substituted or unsubstituted monovalent hydrocarbon groups, such as alkyl groups, alkenyl groups, aryl groups, aralkyl groups, and halogenated alkyl groups; glycidoxyalkyl groups, such as a 3-glycidoxypropyl group and 4-glycidoxybutyl group; epoxycyclohexylalkyl groups, such as a 2-(3,4-epoxycyclohexyl)ethyl group and 3-(3,4-epoxycyclohexyl)propyl group; epoxyalkyl groups, such as a 4-epoxybutyl group and 8-epoxyoctyl group; a 3-methacryloxypropyl group; an isocyanate group; an isocyanurate group; and a hydrogen atom.

As other optional components, the present composition may also contain one type or two or more types of inorganic fillers selected from silica, glass, alumina, or the like; silicone rubber powders; resin powders, such as silicone resins and polymethacrylate resins; and at least one type of component selected from heat resistant agents, dyes, pigments, flame retardants, surfactants, solvents, or the like, as long as the object of the present invention is not impaired.

EXAMPLES

The organopolysiloxane, production method thereof, and curable silicone composition of the present invention will be described in detail using Examples. Note that the viscosity in the Examples is the value at 25° C. Furthermore, in the formulas, "Me" represents a methyl group, "Ph" represents a phenyl group, and "Vi" represents a vinyl group.

<Weight Average Molecular Weight and Molecular Weight Dispersity>

The weight average molecular weight and molecular weight dispersity in terms of standard polystyrene were determined by dissolving an organopolysiloxane in THF and then analyzing the solution via gel permeation chromatography.

Practical Example 1

In a reaction vessel, 130.05 g of toluene, 121.96 g of a 58.6 mass % toluene solution of organopolysiloxane resin (weight average molecular weight: 1,560; molecular weight dispersity: 1.15) represented by the following average unit formula:

$(PhSiO_{3/2})_{0.75}(ViMe_2SiO_{1/2})_{0.25}$ and 41.29 g (an amount where the amount of silicon-atom bonded hydrogen atoms in this component was 2 mol per 1 mol of vinyl groups in the organopolysiloxane resin described above) of disiloxane represented by the following formula:

$HMe_2SiOSiMe_2H$ were placed, subjected to azeotropic dehydration at 112° C., and then cooled to room temperature. Thereafter, a 1,3-divinyl-1,1,3,3-tetramethyldisiloxane complex of platinum (at an amount where platinum metal in this complex was 7 ppm in terms of mass relative to the total amount of the organopolysiloxane resin and the disiloxane) was added to react at the reflux temperature of toluene, which was 100° C. to 105° C., for 1 hour. Then, toluene was distilled off by heating and depressurization at 113° C. and 45 mmHg to obtain a colorless transparent viscous liquid having a refractive index of 1.5183 and viscosity of 21,400 mPa·s. It was found that this liquid was the organopolysiloxane represented by the following average unit formula:

$(PhSiO_{3/2})_{0.75}(HMe_2SiOSiMe_2\text{-}C_2H_4\text{-}Me_2SiO_{1/2})_{0.25}$ and had weight average molecular weight of 2,370 and molecular weight dispersity of 1.16.

Practical Example 2

In a reaction vessel, 87.51 g of toluene, 80.49 g of a 54.2 mass % toluene solution of organopolysiloxane resin (weight average molecular weight: 1,500; molecular weight dispersity: 1.15) represented by average unit formula:

$(PhSiO_{3/2})_{0.80}(ViMe_2SiO_{1/2})_{0.20}$ and 31.39 g (an amount where the amount of silicon-atom bonded hydrogen atoms in this component was 3 mol per 1 mol of vinyl groups in the organopolysiloxane resin described above) of trisiloxane represented by the following formula:

$HMe_2SiOPh_2SiOSiMe_2H$ were placed, subjected to azeotropic dehydration at 113° C., and then cooled to room temperature. Thereafter, a 1,3-divinyl-1,1,3,3-tetramethyldisiloxane complex of platinum (at an amount where platinum metal in this complex was 5 ppm in terms of mass relative to the total amount of the organopolysiloxane resin and the trisiloxane) was added to react at the reflux temperature of toluene, which was 105° C., for 2 hours. Thereafter, the obtained substance was cooled to room temperature and mixed with 10.5 g of activated carbon. Then, the mixture was filtered using a glass filter. Toluene was distilled off by subjecting the filtrate to heating and depressurization to 103° C. and 3 mmHg to obtain a colorless transparent viscous liquid with fluidity having a refractive index of 1.5252 and viscosity of 250,000 mPa·s or higher. It was found that this liquid was the organopolysiloxane represented by the following average unit formula:

$(PhSiO_{3/2})_{0.80}(HMe_2SiOPh_2SiOSiMe_2\text{-}C_2H_4\text{-}Me_2SiO_{1/2})_{0.20}$ and had weight average molecular weight of 2,170 and molecular weight dispersity of 1.13.

Practical Example 3

In a reaction vessel, 113.83 g of toluene, 82.47 g of a 60.2 mass % toluene solution of organopolysiloxane resin (weight average molecular weight: 1,560) represented by the following average unit formula:

$(PhSiO_{3/2})_{0.75}(ViMe_2SiO_{1/2})_{0.25}$ and 65.77 g (an amount where the amount of silicon-atom bonded hydrogen atoms in this component was 2 mol per 1 mol of vinyl groups in the organopolysiloxane resin described above) of diorganopolysiloxane represented by the following average formula:

$HMe_2SiO(Ph_2SiO)_{2.5}SiMe_2H$ were placed, subjected to azeotropic dehydration, and then cooled to room temperature. Thereafter, a 1,3-divinyl-1,1,3,3-tetramethyldisiloxane complex of platinum (at an amount where platinum metal in this complex was 7 ppm in terms of mass relative to the total amount of the organopolysiloxane resin and the diorganopolysiloxane) was added to react at the reflux temperature of toluene, which was 111° C. to 114° C., for 2 hours. Thereafter, the obtained substance was cooled to room temperature and mixed with 7.1 g of activated carbon. Then, the mixture was filtered using a glass filter. Toluene was distilled off by subjecting the filtrate to heating and depressurization to 118° C. and 2 mmHg to obtain a syrup-like viscous liquid that is colorless and transparent at room temperature having a refractive index of 1.5598. This liquid was a mixture containing 19% of unreacted diorganopolysiloxane, 43% of the organopolysiloxane (weight average molecular weight: 3,109) represented by the following average unit formula:

$(PhSiO_{3/2})_{0.75}[HMe_2SiO(Ph_2SiO)_{2.5}SiMe_2\text{-}C_2H_4\text{-}Me_2SiO_{1/2}]_{0.25}$ and 38% of the organopolysiloxane (weight average molecular weight: 11,636) represented by the following average unit formula:

$(PhSiO_{3/2})_{0.75}[HMe_2SiO(Ph_2SiO)_{2.5}SiMe_2\text{-}C_2H_4\text{-}Me_2SiO_{1/2}]_x[O_{1/2}SiMe_2\text{-}C_2H_4\text{-}Me_2SiO(Ph_2SiO)_{2.5}Me_2Si\text{—}C_2H_4\text{-}Me_2SiO_{1/2}]_y$ Note that "x" and "y" were positive numbers, and "x"+"y"/2 was 0.25.

Practical Example 4

In a reaction vessel, 79.46 g of toluene, 126.39 g of a 58.6 mass % toluene solution of organopolysiloxane resin (weight average molecular weight: 1,560) represented by the following average unit formula:

$(PhSiO_{3/2})_{0.75}(ViMe_2SiO_{1/2})_{0.25}$ and 30.00 g (an amount where the amount of silicon-atom bonded hydrogen atoms in this component was 2 mol per 1 mol of vinyl groups in the organopolysiloxane resin described above) of 1,4-bis(dimethylsilyl)benzene represented by the following formula:

$HMe_2Si\text{—}C_6H_4\text{—}SiMe_2H$ were placed, subjected to azeotropic dehydration, and then cooled to room temperature. Thereafter, a 1,3-divinyl-1,1,3,3-tetramethyldisiloxane complex of platinum (at an amount where platinum metal in this complex was 3.5 ppm in terms of mass relative to the total amount of the organopolysiloxane resin and the 1,4-bis(dimethylsilyl)benzene) was added to react at the reflux temperature of toluene, which was 116° C., for 2 hours. Thereafter, the obtained substance was cooled to room temperature and mixed with 12.8 g of activated carbon. Then, the mixture was filtered using a glass filter. Toluene was distilled off by subjecting the filtrate to heating and depressurization to 98° C. and 8 mmHg to obtain a syrup-like viscous liquid that is colorless and transparent at room temperature having a refractive index of 1.543. This liquid was a mixture containing 32% of unreacted diorganopolysiloxane, 20% of the organopolysiloxane (weight average molecular weight: 1,940) represented by the following average unit formula:

$(PhSiO_{3/2})_{0.75}(HMe_2Si\text{—}C_6H_4\text{—}SiMe_2\text{-}C_2H_4\text{-}Me_2SiO_{1/2})_{0.25}$ and 49% of the organopolysiloxane (weight average molecular weight: 5,100) represented by the following average unit formula:

$(PhSiO_{3/2})_{0.75}(HMe_2Si\text{—}C_6H_4\text{—}SiMe_2\text{-}C_2H_4\text{-}Me_2SiO_{1/2})_x(O_{1/2}SiMe_2\text{-}C_2H_4\text{-}Me_2Si\text{—}C_6H_4\text{—}Me_2Si\text{-}C_2H_4\text{-}Me_2SiO_{1/2})_y$ Note that "x" and "y" were positive numbers, and "x"+"y"/2 was 0.25.

Practical Example 5

At room temperature, 25 parts by mass of trisiloxane represented by the following formula:

$ViMe_2SiOPh_2SiOSiMe_2Vi$ 100 parts by mass of the organopolysiloxane prepared in Practical Example 1 (an amount where the amount of silicon-atom bonded hydrogen atoms in this component was 1.2 mol per 1 mol of vinyl groups in the trisiloxane described above), a 1,3-divinyl-1,1,3,3-tetramethyldisiloxane complex of platinum (at an amount where platinum metal in this complex was 3 ppm in terms of mass relative to the total amount of the organopolysiloxane and the trisiloxane), and 0.03 parts by mass of 1,3,5,7-tetramethyl-1,3,5,7-tetravinyl-cyclotetrasiloxane as a reaction inhibitor were mixed to prepare a curable silicone composition.

Thereafter, this curable silicone composition was cured in a plate shape having the thickness of 1 mm, length of 20 mm, width of 10 mm under a condition at 150° C. for 1 hour. This cured product had no surface stickiness and was transparent. When the storage elastic modulus of this cured product at 25° C. was measured using the ARES Rheometer (RDA700, manufactured by Rheometric Scientific) under the following conditions: measurement interval: 15 mm; torsion: 0.5%; and frequency: 1 Hz, the storage elastic modulus was 2.4 MPa.

INDUSTRIAL APPLICABILITY

The organopolysiloxane of the present invention can be used as a raw material for hydrosilylation curable silicone composition since the organopolysiloxane has a siloxane residue or silphenylene residue having a silicon atom-bonded hydrogen atom in an organopolysiloxane resin block. The composition obtained in this manner may be used as an adhesive, potting agent, protective coating agent, or underfill agent for electrical/electronic use. In particular, the composition is suitable as an adhesive, potting agent, protective coating agent, or underfill agent, in a semiconductor element for optical applications.

The invention claimed is:

1. An organopolysiloxane represented by the following average unit formula:

$(R^1SiO_{3/2})_a(XR^2{}_2SiO_{1/2})_b(O_{1/2}SiR^2{}_2\text{—}Y\text{—}R^2{}_2SiO_{1/2})_c$ wherein, $R^1$ and $R^2$ each independently represent an alkyl group having from 1 to 12 carbons, aryl group having from 6 to 20 carbons, or aralkyl group having from 7 to 20 carbons;

X represents an alkenyl group having from 2 to 12 carbons or a siloxane residue represented by the following general formula (1):

$HR^3{}_2SiO(R^3{}_2SiO)_nSiR^3{}_2\text{—}R^4\text{—}$ where $R^3$ each independently represent an alkyl group having from 1 to 12 carbons, aryl group having from 6 to 20 carbons, or aralkyl group having from 7 to 20 carbons, $R^4$ represents an alkylene group having from 2 to 12 carbons, and "n" is a number in a range of 0 to 5, and Y represents a siloxane linking group represented by the following general formula (2):

$\text{—}R^4\text{—}R^3{}_2SiO(R^3{}_2SiO)_nSiR^3{}_2\text{—}R^4\text{—}$ where $R^3$, $R^4$, and "n" are as above; or X represents an alkenyl group having from 2 to 12 carbons or a silphenylene residue represented by the following general formula (3):

$HR^3{}_2Si\text{—}C_6H_4\text{—}SiR^3{}_2\text{—}R^4\text{—}$ where $R^3$ and $R^4$ are as above, and Y represents a silphenylene linking group represented by the following general formula (4):

$\text{—}R^4\text{—}R^3{}_2Si\text{—}C_6H_4\text{—}SiR^3{}_2\text{—}R^4\text{—}$ where $R^3$ and $R^4$ are as above; and "a" is a number in a range of 0.65 to 0.90, "b" is a number in a range of 0.10 to 0.35, "c" is a number in a range of 0 to 0.10, and "a"+"b"+"c"=1.00; and wherein the organopolysiloxane includes at least one siloxane residue represented by formula (1) or the organopolysiloxane includes at least one silphenylene residue represented by formula (3).

2. The organopolysiloxane according to claim 1, wherein at least 10 mol % of $R^1$ are aryl groups having from 6 to 20 carbons.

3. The organopolysiloxane according to claim 2, wherein at least 10 mol % of $R^1$ are phenyl groups.

4. The organopolysiloxane according to claim 1, wherein $R^4$ is an ethylene group.

5. The organopolysiloxane according claim 1, wherein its refractive index at 25° C. for visible light at 589 nm is 1.50 or higher.

6. A method of producing the organopolysiloxane according to claim 1, the method comprising subjecting
(A) an organopolysiloxane resin represented by the following average unit formula:

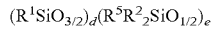

where $R^1$ and $R^2$ each independently represent an alkyl group having from 1 to 12 carbons, aryl group having from 6 to 20 carbons, or aralkyl group having from 7 to 20 carbons; $R^5$ represents an alkenyl group having from 2 to 12 carbons; "d" is a number in a range of 0.65 to 0.90, "e" is a number in a range of 0.10 to 0.35, and "d"+"e"=1.00; and
(B)
(B1) a diorganosiloxane represented by the following general formula:

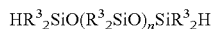

where $R^3$ each independently represent an alkyl group having from 1 to 12 carbons, aryl group having from 6 to 20 carbons, or aralkyl group having from 7 to 20 carbons, and "n" is a number in a range of 0 to 5, or
(B2) a disilylbenzene represented by the following general formula:

where $R^3$ is as above;
to a hydrosilylation reaction at an amount so that an amount of silicon atom-bonded hydrogen atoms in component (B) exceeds 1 mol per 1 mol of alkenyl groups in component (A).

7. The method according to claim 6, wherein at least 10 mol % of $R^1$ in component (A) are aryl groups having from 6 to 20 carbons.

8. The method according to claim 7, wherein $R^5$ in component (A) is a vinyl group.

9. A hydrosilylation curable silicone composition comprising the organopolysiloxane according to claim 1.

10. A hydrosilylation curable silicone composition comprising:
(I) an organopolysiloxane having at least two alkenyl groups in a molecule;
(II) an organopolysiloxane in an amount that an amount of silicon atom-bonded hydrogen atoms in this component is from 0.1 to 10 mol per 1 mol of alkenyl groups in component (I); and
(III) a hydrosilylation catalyst, in an amount that accelerates curing of the composition;
wherein component (II) is according to claim 1.

11. The organopolysiloxane according to claim 1, wherein X is the alkenyl group having from 2 to 12 carbons.

12. The organopolysiloxane according to claim 1, wherein X is the siloxane residue represented by formula (1).

13. The organopolysiloxane according to claim 1, wherein Y represents the siloxane linking group represented by formula (2).

14. The organopolysiloxane according to claim 1, wherein X is the silphenylene residue represented by formula (3).

15. The organopolysiloxane according to claim 1, wherein Y represents the silphenylene linking group represented by formula (4).

16. The organopolysiloxane according to claim 1, having at least one siloxane residue represented by formula (1).

17. The organopolysiloxane according to claim 1, having at least one siloxane residue represented by formula (3).

18. A method of producing an organopolysiloxane represented by the following average unit formula:

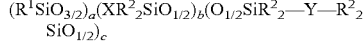

wherein,
$R^1$ and $R^2$ each independently represent an alkyl group having from 1 to 12 carbons, aryl group having from 6 to 20 carbons, or aralkyl group having from 7 to 20 carbons;
X represents a siloxane residue represented by the following general formula (1):

where $R^3$ each independently represent an alkyl group having from 1 to 12 carbons, aryl group having from 6 to 20 carbons, or aralkyl group having from 7 to 20 carbons, $R^4$ represents an alkylene group having from 2 to 12 carbons, and "n" is a number in a range of 0 to 5, and
Y represents a siloxane linking group represented by the following general formula (2):

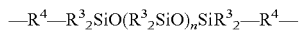

where $R^3$, $R^4$, and "n" are as above; or
X represents a silphenylene residue represented by the following general formula (3):

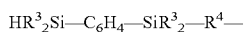

where $R^3$ and $R^4$ are as above, and
Y represents a silphenylene linking group represented by the following general formula (4):

where $R^3$ and $R^4$ are as above; and
"a" is a number in a range of 0.65 to 0.90, "b" is a number in a range of 0.10 to 0.35, "c" is a number in a range of 0 to 0.10, and "a"+"b"+"c"=1.00;
the method comprising subjecting
(A) an organopolysiloxane resin represented by the following average unit formula:

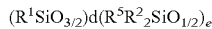

where $R^1$ and $R^2$ each independently represent an alkyl group having from 1 to 12 carbons, aryl group having from 6 to 20 carbons, or aralkyl group having from 7 to 20 carbons; $R^5$ represents an alkenyl group having from 2 to 12 carbons; "d" is a number in a range of 0.65 to 0.90, "e" is a number in a range of 0.10 to 0.35, and "d"+"e"=1.00; and
(B)
(B1) a diorganosiloxane represented by the following general formula:

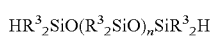

where $R^3$ each independently represent an alkyl group having from 1 to 12 carbons, aryl group having from 6 to 20 carbons, or aralkyl group having from 7 to 20 carbons, and "n" is a number in a range of 0 to 5, or
(B2) a disilylbenzene represented by the following general formula:

$$HR^3{}_2Si-C_6H_4-SiR^3{}_2H$$

where $R^3$ is as above;
to a hydrosilylation reaction at an amount so that an amount of silicon atom-bonded hydrogen atoms in component (B) exceeds 1 mol per 1 mol of alkenyl groups in component (A).

19. The method according to claim 18, wherein at least 10 mol % of $R^1$ in component (A) are aryl groups having from 6 to 20 carbons.

20. The method according to claim 19, wherein $R^5$ in component (A) is a vinyl group.

* * * * *

UNITED STATES PATENT AND TRADEMARK OFFICE
CERTIFICATE OF CORRECTION

PATENT NO.        : 10,316,148 B2
APPLICATION NO.   : 15/559419
DATED             : June 11, 2019
INVENTOR(S)       : Yoshitsugu Morita Page 1 of 1

It is certified that error appears in the above-identified patent and that said Letters Patent is hereby corrected as shown below:

In the Claims

Column 16, Claim 17, Line 14:
"siloxane residue"
Should read:
--silphenylene residue--

Column 16, Claim 18, Line 55:
"$(R^1SiO_{3/2})d(R^5R^2{}_2SiO_{1/2})_e$"
Should read:
--$(R^1SiO_{3/2})_d(R^5R^2{}_2SiO_{1/2})_e$--

Signed and Sealed this
Twenty-seventh Day of August, 2019

Andrei Iancu
*Director of the United States Patent and Trademark Office*